United States Patent
Wartmann et al.

(10) Patent No.: US 7,133,212 B2
(45) Date of Patent: Nov. 7, 2006

(54) LIQUID IMMERSION MICROSCOPE OBJECTIVE

(75) Inventors: Rolf Wartmann, Waake (DE); Joerg Sprenger, Goettingen (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 11/182,593

(22) Filed: Jul. 14, 2005

(65) Prior Publication Data
US 2006/0018030 A1  Jan. 26, 2006

(30) Foreign Application Priority Data
Jul. 24, 2004  (DE) .................. 10 2004 036 114

(51) Int. Cl.
*G02B 21/02* (2006.01)
(52) U.S. Cl. ..................................... 359/656
(58) Field of Classification Search ............... 359/656, 359/657–661
See application file for complete search history.

(56) References Cited

U.S. PATENT DOCUMENTS

| | | | | |
|---|---|---|---|---|
| 5,270,860 A | * | 12/1993 | Suzuki | 359/660 |
| 5,502,596 A | * | 3/1996 | Suzuki | 359/657 |
| 5,517,360 A | * | 5/1996 | Suzuki | 359/658 |
| 5,659,425 A | * | 8/1997 | Suzuki | 359/658 |
| 5,978,147 A | | 11/1999 | Kudo | 359/656 |
| 5,982,559 A | * | 11/1999 | Furutake | 359/656 |
| 2003/0043473 A1 | * | 3/2003 | Okuyama | 359/659 |
| 2003/0076600 A1 | | 4/2003 | Watanabe | 359/656 |
| 2005/0207021 A1 | * | 9/2005 | Yamaguchi | 359/658 |

FOREIGN PATENT DOCUMENTS

| | | |
|---|---|---|
| DE | 1 272 578 | 7/1968 |
| DE | 288 244 | 3/1991 |
| GB | 438860 | 11/1935 |
| JP | 8-292374 | 11/1996 |

* cited by examiner

*Primary Examiner*—Ricky L. Mack
*Assistant Examiner*—Darryl J. Collins
(74) *Attorney, Agent, or Firm*—Reed Smith LLP

(57) ABSTRACT

The invention is directed to an immersion microscope objective. This microscope objective contains four lens groups. The first lens group has a focal length of 2.6f–3.1f, where f is the total focal length of the microscope objective. The first lens group contains two lens components with a collecting effect. The first lens component has a focal length of 3f–4.5f. One of the lenses in the first lens component is made from a material with n greater than 1.72. A lens of the second lens component is made from a material with a partial dispersion of a first type. The second lens group with a focal length of 8f–10.2f comprises at least two lenses which are cemented together. A collecting lens is made from a material with a partial dispersion of the first type, and a diverging lens is made from a material with a partial dispersion of a second type. There follows a third lens group with a focal length greater than |25f|. The third lens group-times contains at least two lenses which are cemented together, one of which is a collecting lens made from a material with a fluor crown anomaly. Finally, there follows a fourth lens group with a focal length greater than |6⅔f| and comprising two meniscus-shaped lenses whose hollow surfaces face one another.

5 Claims, 3 Drawing Sheets

LIQUID IMMERSION MICROSCOPE OBJECTIVE

CROSS-REFERENCE TO RELATED APPLICATION

This application claims priority of German Application No. 10 2004 036 114.2, filed Jul. 24, 2004, the complete disclosure of which is hereby incorporated by reference.

BACKGROUND OF THE INVENTION a) Field of the Invention

The invention is directed to a liquid immersion microscope objective.

b) Description of the Related Art

Liquid immersion microscope objectives are used predominantly in the area of physiology where manipulation of living cells is performed in water. These cells and their reactions are then observed. Therefore, the liquid immersion microscope objectives used for this purpose must be designed in such a way that they can be immersed with their object-side lens in the cell culture liquid which is also the immersion liquid at the same time and, as a rule, mostly comprises water. Since living cells are worked with, the objectives must also permit integration of devices for preserving the life of the cells and must also leave sufficient free space for manipulation of the cell samples. Therefore, the objectives employed must be very slender. In the front, object-side area in particular, an angle of at least 35°—measured from the object plane—to the sample must be freely accessible to enable manipulation with different devices. A relatively large working distance of about 2 mm is likewise required.

Further, the samples to be examined are often so thick that sufficient examinations in visible light are impossible because the sample absorbs too much light. The desired resolution is not achieved until the infrared range.

Therefore, objectives of the type mentioned above must meet two contradictory requirements: on the one hand, the working distance must be as large as possible and the sample must be freely accessible at an angle of at least 35°; on the other hand, the numerical aperture must be as large as possible in order to achieve a high resolution.

An individual objective that meets these requirements, namely, the "CFI Fluor60×W" by Nikon, is known from the prior art. However, the chromatic correction in this objective is deficient. In particular, the longitudinal color aberration in the infrared range cannot be overcome to a sufficient degree and amounts to a multiple of the depth of field. The objectives disclosed in US 2003/0076600 and JP 8292374 have the same weakness.

OBJECT AND SUMMARY OF THE INVENTION

Therefore, it is the primary object of the invention to develop an immersion microscope objective whose numerical aperture is at least 1.0 and which further allows a working distance of at least 2 mm and a sample accessibility of at least 35° and is chromatically corrected in particular in the wavelength range from 435 nm to 1000 nm.

This object is met by an immersion microscope objective which has a total of four lens groups. The focal length of the first lens group—considered from the object plane—is positive and is between 2.6-times and 3.1-times the focal length of the entire objective f. The first lens group comprises a first lens component and a second lens component, each having a collecting effect. The lens components can be individual collector lenses or lenses that are cemented together with a combined collecting effect. The focal length of the first lens component is between 3-times and 4.5-times the objective focal length f. Further, one of the lenses of the first lens component is made of lanthan glass and has a refractive index $n_e > 1.72$, where $n_e$ is the refractive index at a wavelength of 546.07 nm. A lens of the second lens component is made from a material with a partial dispersion of a first type, for example, fluor crown glass or $CaF_2$. Following the latter is a second lens group with a focal length between 8-times and 10.2-times the objective focal length f. The second lens group comprises at least two lenses which are cemented together, one of which is made from a material with a partial dispersion of the first type and has a collecting effect. A second lens is made from a material with a partial dispersion of a second type—for example, short flint glass or a lanthan glass—and has a diverging effect. Following the second lens group is a third lens group with a focal length whose absolute value is greater than 25-times the objective focal length f. The third lens group likewise comprises at least two lenses which are cemented together, at least one of which is made from a material with a partial dispersion of the first type and has a collecting effect. Finally, there follow a fourth lens group with a focal length greater than 6⅔-times the objective focal length f. This fourth lens group comprises two meniscus-shaped lenses whose hollow surfaces face one another.

A glass with a fluor crown anomaly, e.g., fluor crown glass or $CaF_2$, is preferably selected for the lenses comprising a material with a partial dispersion of the first type. Glass with a short flint anomaly, e.g., short flint glass, is preferably chosen for the lenses made of a material with a partial dispersion of the second type. Lanthan glass can also be used.

The working distance of the objective according to the invention is approximately 2 mm and the numerical aperture is 1.0. Therefore, a high resolution can be achieved. Since, in addition, the beam path is so designed that lenses of increasingly smaller diameter in direction of the objective can be used, i.e., the objective tapers, it is ensured that the sample can be accessed at an angle of 35°. The longitudinal color aberrations in this objective lie within the depth of field over the entire spectral range.

Advantageous constructions of the immersion microscope objective result from the constructional data indicated in subclaims 4 and 5. The refractive indices refer to a wavelength of 546.07 nm. The Abbe numbers $v_e$ were calculated from the following equation:

$$v_e = \frac{n_e - 1}{n_{F'} - n_{C'}},$$

where $n_e$ is the refractive index at a wavelength of 546.07 nm, $n_{C'}$ is the refractive index at a wavelength of 643.85 nm, and $n_{F'}$ is the refractive index at a wavelength of 479.99 nm.

In the following, the microscope objective will be described more fully with reference to embodiment examples.

DESCRIPTION OF THE PREFERRED EMBODIMENTS

Figure 1:
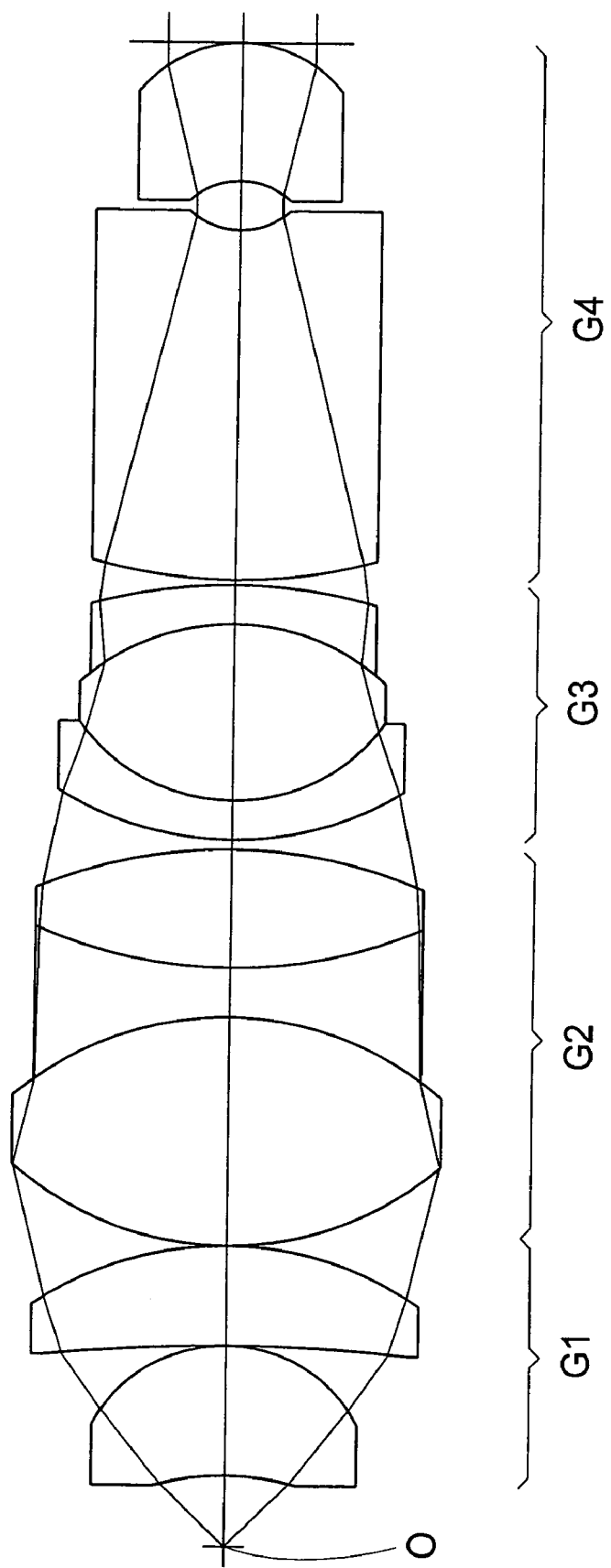
FIG. 1 shows the basic construction of the objective comprising four lens groups.

FIG. 1 shows a sectional view of the objective according to the invention. The object plane O is located at far left, the objective with the four lens groups G1, G2, G3 and G4 is located at a distance of about 2 mm.

Figure 2:
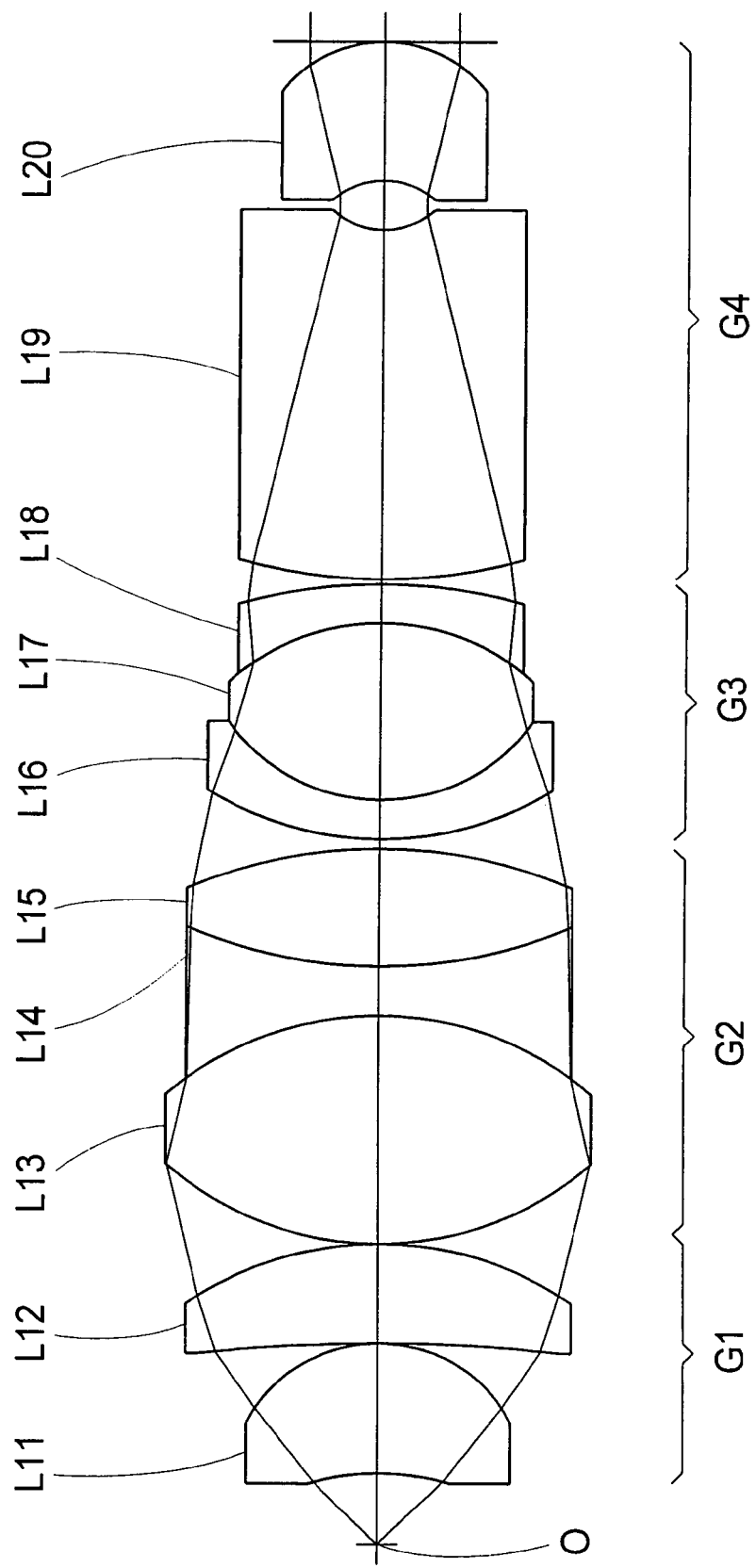
FIG. 2 shows a possible construction of the objective based on the specifications in subclaim 4.

FIG. 2 shows a possible construction of the objective according to subclaim 4. The first lens group G1 contains two lenses L1 and L12. Lens L11 is located at a distance of 2 mm, measured in the optical axis from the object plane O. The thickness of this lens at the optical axis is 4.32 mm; it is made from a lanthan glass with a refractive index of 1.75453. Lens L12 is located in the optical axis at a distance of 0.10 mm from lens L11. The second lens group G2 contains lenses L13, L14 and L15 which are cemented together. It is arranged at a distance of 0.05 mm from the first lens group. Lens L14 is a diverging lens made of a glass with a short flint anomaly. Lenses L13 and L15 are both made from the same material, a glass with a fluor crown anomaly. There follows at a distance of 0.26 mm the third lens group G3 comprising lenses L16, L17 and L18 which are cemented together. Lens L17 is a collecting lens made of a glass with a fluor crown anomaly. Finally, the fourth lens group G4 which is at a distance of 0.12 mm from lens group G3 contains two meniscus-shaped lenses L19 and L20. The two lenses face one another by their hollow surfaces, their distance in the optical axis is 1.68 mm. The numerical aperture of the objective constructed with these specifications is 1.0 and the focal length is 2.61 mm. The working distance is 2.5 mm.

Figure 3:
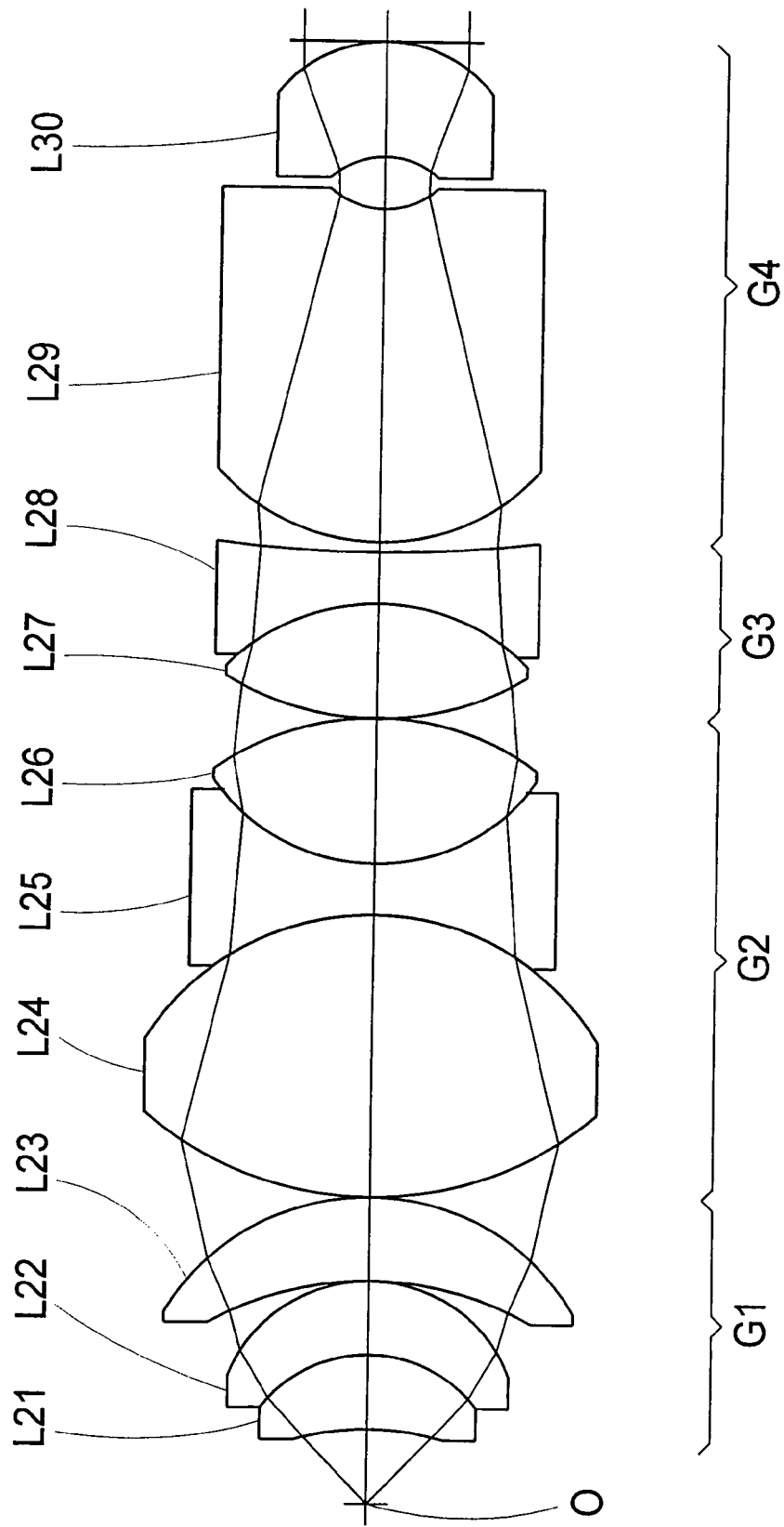
FIG. 3 shows a possible construction of the objective based on the specifications indicated in subclaim 5.

FIG. 3 shows a sectional view of the objective according to the specifications in subclaim 5. The first lens group G1 comprises three lenses L21, L22 and L23. Lenses L21 and L22 are cemented together. Lens L22 is made from a lanthan glass and has a refractive index of 1.88815. The distance between the first lens component comprising lenses L21 and L22 and the second lens component with lens L23 is 0.1 mm. There follows the second lens group G2 with lenses L24, L25 and L26, likewise at a distance of 0.1 mm from lens L23. All three lenses are cemented together. Lens L25 is a diverging lens made from a material with a short flint anomaly. Lens L26 is made from a material with a fluor crown anomaly. There follows at a distance of 0.10 mm from lens L26 the third lens group G3 with lenses L27 and L28. The two lenses are cemented together. Lens L27 has a collecting effect and is made of a material with a fluor crown anomaly. Finally, there follows at a distance of 0.2 mm from lens L28 the fourth lens group G4 with the two meniscus-shaped lenses L29 and L30. These two lenses have a distance of 2.5 mm from one another in the optical axis. Also, the numerical aperture in this objective is 1.0 and the focal length is 2.61 mm. The working distance is 2.1 mm.

When using a tube lens with an object-side radius of 189.417 mm, an image-side radius of −189.417 mm, a diameter of 10.9 mm, a refractive index $n_e$ of 1.58212, an Abbe number of 53.59 and a focal length of 164.44 mm, a magnification of −63 is achieved with the two objectives in combination with the tube lens arranged downstream.

While the foregoing description and drawings represent the present invention, it will be obvious to those skilled in the art that various changes may be made therein without departing from the true spirit and scope of the present invention.

REFERENCE NUMBERS

G1 . . . G4 lens groups
L11 . . . L30 lenses
O object plane

What is claimed is:

1. An immersion microscope objective comprising in order from the object plane:
a first lens group with a focal length between 2.6-times and 3.1-times the focal length of the objective f and comprising a first lens component and a second lens component, each having a collecting effect, wherein the focal length of the first lens component is between 3-times and 4.5-times the objective focal length and one of the lenses of the first lens component is made of lanthan glass with a refractive index $n_e > 1.72$ at a wavelength of 546.07 nm, and wherein a lens of the second lens component is made from a material with a partial dispersion of a first type; a second lens group with a focal length between 8-times and 10.2-times the objective focal length and comprising at least two lenses which are cemented together, one of which is made from a material with a partial dispersion of the first type and has a collecting effect, the other lens being made from a material with a partial dispersion of a second type and having a diverging effect; a third lens group with a focal length whose absolute value is greater than 25-times the objective focal length and comprising at least two lenses which are cemented together, at least one of which is made from a material with a partial dispersion of the first type and has a collecting effect; and a fourth lens group with a focal length greater than 6⅔-times the objective focal length and comprising two meniscus-shaped lenses whose hollow surfaces face one another.

2. An immersion microscope objective according to claim 1, wherein glass with a fluor crown anomaly is provided as material with a partial dispersion of a first type for the lenses.

3. An immersion microscope objective according to claim 1, wherein glass with a short flint anomaly is provided as material with a partial dispersion of a second type for the lenses.

4. An immersion microscope objective according to claim 1, having the following specifications with radii r, thicknesses d and distances a in mm, refractive index $n_e$ at a wavelength of 546.07 nm and Abbe numbers $v_e$:

|  | r | d | a | $n_e$ | $v_e$ |
|---|---|---|---|---|---|
| Object plane ∞ | | | 2.00 | | |
| L11 | −8.9125 | 4.32 | | 1.75453 | 35.10 |
| | −5.0845 | | 0.10 | | |
| L12 | −52.330 | 3.03 | | 1.53019 | 76.58 |
| | −10.145 | | 0.05 | | |
| L13 | 10.902 | 6.02 | | 1.43985 | 94.53 |
| | −11.465 | | | | |
| L14 | | 1.37 | | 1.64132 | 42.20 |

-continued

|  | r | d | a | $n_e$ | $v_e$ |
|---|---|---|---|---|---|
| L15 | 16.430 | 3.92 |  | 1.43985 | 94.53 |
|  | −14.749 |  | 0.26 |  |  |
| L16 | 13.626 | 1.11 |  | 1.55099 | 45.47 |
|  | 5.8715 |  |  |  |  |
| L17 |  | 6.37 |  | 1.43496 | 94.64 |
|  | −7.1821 |  |  |  |  |
| L18 |  | 1.20 |  | 1.75453 | 35.10 |
|  | −23.714 |  | 0.12 |  |  |
| L19 | 11.715 | 11.99 |  | 1.82017 | 46.37 |
|  | 3.3497 |  | 1.68 |  |  |
|  | −2.8184 |  |  |  |  |
| L20 |  | 4.36 |  | 1.75453 | 35.10 |
|  | −4.9403. |  |  |  |  |

5. An immersion microscope objective according to claim 1, having the following specifications with radii r, thicknesses d and distances a in mm, refractive index $n_e$ at a wavelength of 546.07 nm and Abbe numbers $v_e$:

|  | r | d | a | $n_e$ | $v_e$ |
|---|---|---|---|---|---|
| Object plane ∞ |  | 2.00 |  |  |  |
|  | −9.5000 |  |  |  |  |

-continued

|  | r | d | a | $n_e$ | $v_e$ |
|---|---|---|---|---|---|
| L21 |  | 1.80 |  | 1.60099 | 56.37 |
|  | −4.6788 |  |  |  |  |
| L22 |  | 2.10 |  | 1.88815 | 40.52 |
|  | −4.4530 |  | 0.10 |  |  |
| L23 | −10.680 | 1.80 |  | 1.43985 | 94.53 |
|  | −7.1943 |  | 0.10 |  |  |
| L24 | 9.6501 | 9.43 |  | 1.53019 | 76.58 |
|  | −8.2375 |  |  |  |  |
| L25 | 6.5691 | 1.40 |  | 1.64132 | 42.20 |
| L26 | −12.172 | 5.00 |  | 1.43985 | 94.53 |
|  |  |  | 0.10 |  |  |
|  | 10.996 |  |  |  |  |
| L27 | −7.1821 | 4.20 |  | 1.43985 | 94.53 |
| L28 | 50.909 | 1.40 |  | 1.71616 | 53.61 |
|  |  |  | 0.20 |  |  |
|  | 7.5314 |  |  |  |  |
| L29 | 2.8359 | 11.20 |  | 1.71616 | 53.61 |
|  |  |  | 2.50 |  |  |
|  | −3.2228 |  |  |  |  |
| L30 | −4.5018. | 3.97 |  | 1.50349 | 56.15 |

\* \* \* \* \*